UNITED STATES PATENT OFFICE.

DANIEL COLLINS, OF PRINCESS ANNE, MARYLAND.

LINIMENT.

SPECIFICATION forming part of Letters Patent No. 228,870, dated June 15, 1880.

Application filed April 24, 1880. (No specimens.)

*To all whom it may concern:*

Be it known that I, DANIEL COLLINS, of Princess Anne, in the county of Somerset, and in the State of Maryland, have invented certain new and useful Improvements in Compound for Liniment; and I do hereby declare that the following is a full, clear, and exact description thereof.

The nature of my invention consists in a compound for liniment, as will be hereinafter more fully set forth.

This liniment is composed of muriatic acid, spirits of ammonia, spirits of turpentine, tincture of capsicum, and sweet or other equivalent oil. It is compounded in about the following proportions: Three parts of muriatic acid and three parts of spirits of ammonia are first poured together and thoroughly mixed, after which I add three parts spirits of turpentine, one part tincture of capsicum, and one part sweet or other oil. When the whole has been well mixed together the liniment is ready for immediate use.

This liniment is intended for both man and beast, and will cure all kinds of rheumatism, neuralgia, bone-tumors, and kindred complaints. It is to be rubbed in with the hand. For animals the rubbed portions must be afterward greased to prevent the hair from coming out.

I do not confine myself to the exact proportions of the ingredients herein mentioned, as they may, perhaps, be varied under different circumstances.

Having thus fully described my invention, what I claim as new, and desire to secure by Letters Patent, is—

The compound for liniment herein described, consisting of muriatic acid, spirits of ammonia, spirits of turpentine, tincture of capsicum, and sweet or other oil, substantially as herein set forth.

In testimony that I claim the foregoing I have hereunto set my hand this 24th day of April, 1880.

DANIEL COLLINS.

Witnesses:
W. ALEXANDER,
H. J. ENNIS.